United States Patent [19]

McMahan et al.

[11] Patent Number: 4,504,951
[45] Date of Patent: Mar. 12, 1985

[54] HIGH SPEED SWITCHING POWER SUPPLY FOR A LIGHT CONTROLLED LASER SYSTEM

[75] Inventors: William H. McMahan; Steve H. Holtman, both of Salt Lake City, Utah

[73] Assignee: American Laser Corporation, Salt Lake City, Utah

[21] Appl. No.: 383,600

[22] Filed: Jun. 1, 1982

[51] Int. Cl.$^3$ ............................................. H01S 3/10
[52] U.S. Cl. ........................................ 372/38; 372/29
[58] Field of Search ....................... 372/38, 29, 30, 31, 372/32, 81; 315/209 R

[56] References Cited

U.S. PATENT DOCUMENTS

| | | | |
|---|---|---|---|
| 4,017,745 | 4/1977 | McMahon | 307/254 |
| 4,345,330 | 8/1982 | Howie et al. | 372/38 |
| 4,355,395 | 10/1982 | Salter et al. | 372/38 |
| 4,468,773 | 8/1984 | Seaton | 372/38 |

Primary Examiner—James W. Davie
Attorney, Agent, or Firm—B. B. Olive

[57] ABSTRACT

A high speed switching power supply for a laser system is disclosed. In the preferred embodiment, proportional-plus-derivative feedback of the emitted light controls the duty cycle of the MOS-FET switching transistor to vary the d.c. voltage level applied across a storage capacitor from a d.c. power supply. The storage capacitor is connected across a laser tube to apply its stored voltage thereto. The MOS-FET transistor permits high speed switching. The derivative portion of the feedback damps out oscillatory tendencies in the feedback loop to permit increased loop bandwidth. The combination of the MOS-FET transistor and proportional-plus-derivative feedback permits the laser output to be controlled in a voltage-controlled mode.

12 Claims, 2 Drawing Figures

HIGH SPEED SWITCHING POWER SUPPLY FOR A LIGHT CONTROLLED LASER SYSTEM

BACKGROUND OF THE INVENTION

1. Field of the Invention

The present invention relates to switched power supplies for laser systems and, more particularly, to a high speed switching power supply for a light controlled laser system.

2. Prior Art

Gas-filled lasers, as for example, argon, krypton, neon or helium type lasers, as well as solid-state lasers that are pumped with gas-filled flash tubes, are typically energized by power supplies that regulate the power of the laser output light. In the past such power supplies have achieved regulation of the laser light power by using a linear pass element to control the electrical current allowed to flow to the laser tube. Typically, the linear pass element consists of a bipolar transistor which functions as a variable current source connected in series between a laser tube and a source of constant d.c. voltage. The linear pass element is controlled by a feedback control circuit which uses the laser light power level of the laser beam current as a feedback parameter.

The problem with utilizing a linear pass element for purposes of controlling laser light power is that the linear pass element dissipates a relatively large amount of energy. For example, the unregulated voltage derived from the a.c. power mains is typically 20% to 30% higher than the laser operating voltage. The difference is taken up by the linear pass element so that 20% to 30% of the power from the a.c. power mains is dissipated by the linear pass element. This large power loss requires a complicated cooling system as well as reducing the efficiency of the laser system.

Some attempts have been made in the prior art to reduce the large power loss that is attendant with the use of a linear pass element for controlling laser beam power. See, for example, U.S. Pat. No. 4,017,745 to McMahan. The McMahan patent discloses a switched power supply wherein parallel-connected transistors, disposed in series between a fixed d.c. voltage and the load, are alternately switched on and off. By varying the duty cycle of the switching transistors, the voltage across a load-bridging capacitor is controlled. When used in conjunction with a laser type of load and a linear pass element, the power dissipation across the linear pass element is reduced to something on the order of 5% of the power dissipated by the laser tube by reducing the amount of the voltage dropped across the linear pass element. Although this greatly improves the overall efficiency of the laser system by reducing the power dissipated through the linear pass element, nevertheless, the increased efficiency comes at the cost of a more complex power supply. Thus, what is needed is a light controlled laser power supply which operates entirely in the switching mode without the aid of the linear pass element employed in virtually all types of light controlled laser systems currently in use. Such a power supply would be more compact and thus more economical to manufacture. However, until the present invention, such a power supply has not been available because of several problems.

For example, the open loop gain function has a frequency dependent magnitude component and a frequency dependent phase component which describe the electrical gain in the control loop of the power supply. The system stability criterion first stated by H. Nyquist in 1932 is that the magnitude of the open loop gain function must be less than unity at those frequencies for which the phase component is greater than 180 degrees. This stability criterion places an upper limit on the system control bandwidth. That is, the system gain function must be rolled off to less than unity before the frequency is reached at which the phase shift accumulation in the system has exceeded 180 degrees. Otherwise, undesirable loop oscillations will occur.

The open loop gain function of the switching type power supply is inherently different from that of the linear pass type power supply. The linear pass element is a high impedance current source and hence, the laser light feedback analog signal directly controls tube current. On the other hand, a switching regulator type power supply typically has a low impedance voltage output so that in this system, the laser light feedback analog signal controls the laser tube voltage rather than current. In a plasma type laser tube, a 5% variation in voltage about some operating point will produce a 50% variation in tube current. This means that the open loop gain function of the switching regulator type power supply is 10 times greater in magnitude than the linear pass type power supply. Consequently, it is much more difficult to accurately control the laser light output without causing system oscillation.

Additionally, the switching regulator type power supply contains a reactive energy storage circuit that restores the switched voltages and currents to the d.c. output level. The energy storage circuit consists of an inductor and a capacitor that cause a 180 degree phase lag at their resonant frequency. The resonant frequency of the reactive storage circuit is set by the switching frequency of the switching controller.

The bandwidth of a switching regulator type laser power supply is limited by the phase lag that occurs as the frequency approaches the resonant frequency of the reactive storage elements. The bandwidth problem is further complicated by the large inherent gain of the low impedance output of the switching type regulator, since the extra gain must be compensated for by a more severe gain roll off to achieve less than unity gain at the resonant frequency of the reactive storage elements.

Thus, until the present invention, the foregoing problems have not been satisfactorily resolved, and this has resulted in the continued use of the linear pass element, with its attendant disadvantages, in virtually all types of laser light controlled power supply systems currently in use. The light controlled laser power supply of this invention overcomes these problems. We have shown experimentally that a unity gain bandwidth of at least 1000 Hz must exist in the low impedance switching type regulator in order to achieve a commercially acceptable laser beam noise level of less than 5 percent peak to peak referred to the beam's average intensity. In order to open up the bandwidth to 1000 Hz, the switching frequency needs to be increased to 100 KHz or more. This allows the resonant frequency of the reactive storage elements to be greater than 2 KHz. Also, to provide acceptable stability as the unity gain of the magnitude function approaches the LC resonant frequency, rate feedback needs to be employed whose phase lead properties tend to cancel the phase lag of the LC resonant circuit.

BRIEF SUMMARY AND OBJECTS OF THE INVENTION

It is an object of the present invention to provide a laser power supply which achieves output light control by controlling the laser supply voltage with a switching type regulator rather than by controlling the laser supply current, as is done with the conventional linear pass element.

It is another object of the present invention to provide a switching power supply for a laser which does not require a linear pass element in series with the laser to achieve control over the output light from the laser.

It is still another object of the present invention to provide a power supply for a light-controlled laser using a switching type voltage regulator operating at high switching frequencies such that the control bandwidth of the regulator is wide enough to operate the laser in a light controlled mode.

Yet another object of the present invention is to provide an improved laser system that is smaller, more efficient, and less expensive to manufacture and operate.

In accordance with the foregoing objects of the present invention, a MOS-FET switching transistor is used to regulate the voltage across the laser tube. The MOS-FET switching transistor may operate at switching frequencies well in excess of 100 kHz with negligible power loss occurring during transition. This permits a significantly increased loop bandwidth. In order to achieve the desired increased loop bandwidth without the attendant risk of loop oscillation, the feedback control signal takes the form of a proportional-plus-derivative signal. The time rate-of-change component of this control signal damps out oscillatory tendencies in the increased bandwidth loop. The higher frequency switching and the proportional-plus-derivative control loop permit sufficient control over the light output from the laser to eliminate the need for a current-controlling linear pass element and to permit operation solely under voltage control.

BRIEF DESCRIPTION OF THE DRAWINGS

The above and still further objects, features and advantages of the present invention will become more apparent upon consideration of the following detailed description of one presently preferred embodiment thereof, taken in conjunction with the accompanying drawings, wherein.

DETAILED DESCRIPTION OF THE PRESENTLY PREFERRED EMBODIMENT

Figure 1:
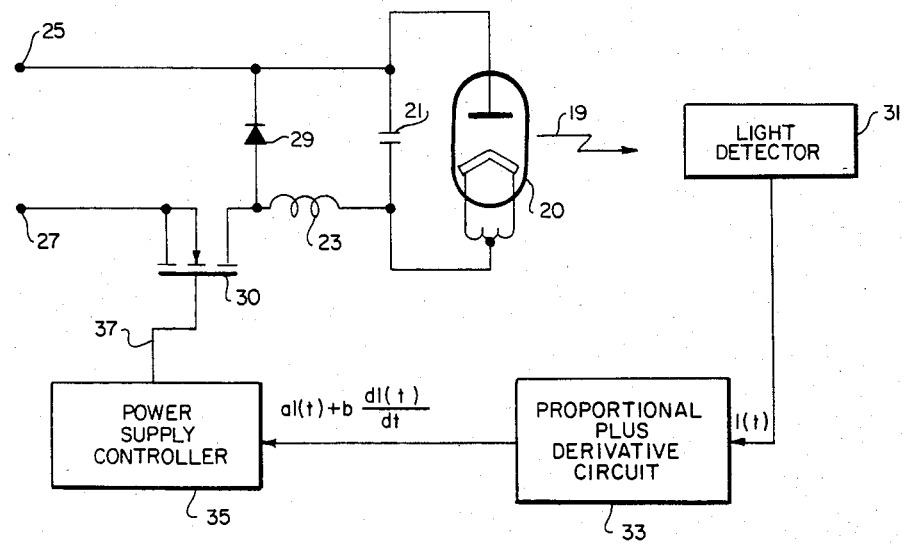
FIG. 1 is a simplified diagram of one presently preferred embodiment of the present invention.

Referring to FIG. 1 in greater detail, a laser tube 20 has a storage capacitor 21 connected in parallel across its supply voltage terminals. Laser tube 20 may be a gas-filled laser (filled, for example, with argon, krypton, neon or helium) or a solid state laser pumped with a gas-filled flash tube. The voltage-dependent parameter of laser tube 20 is the laser light power level, which is schematically illustrated by arrow 19. A source of d.c. voltage is connected across a pair of terminals 25, 27, with terminal 25 connected to one side of capacitor 21 and laser tube 20. The source-drain circuit of MOS-FET switching transistor 30 is connected in series with an inductor 23 between terminal 27 and the other side of capacitor 21 and laser tube 20. A diode 29 has its anode connected to the junction between inductor 23 and the source-drain circuit of MOS-FET transistor 30. The cathode of diode 29 is connected to terminal 25.

Light emitted by laser 20 is sensed by light detector 31 which provides a feedback signal l(t) having an amplitude representing the power level of the emitted light. Light detector 31 is a conventional device and may, for example, include a phototransistor, photomultiplier, or other photodetector device arranged to sense the laser light and provide the required l(t) feedback signal. The feedback signal l(t) may also be derived from the laser tube current.

The feedback signal l(t) is applied to a proportional-plus-derivative circuit 33 which in turn provides an output signal having an amplitude proportional to the sum of the amplitude of signal l(t) and the time rate-of-change of the amplitude of signal l(t). As illustrated in FIG. 1, this signal takes the form:

$$a\, l(t) + \frac{bd\, l(t)}{dt} \tag{1}$$

wherein a and b are proportionality constants dependent upn the particular circuit components employed. This signal is applied to a power supply controller circuit 35. As hereinafter more fully explained, power supply controller 35 provides a gating signal on line 37 which has a rectangular waveform with a duty cycle that varies as a function of the feedback control signal represented by expression (1). This gating signal is applied to the gate electrode of MOS-FET transistor 30 so as to alternately render that transistor conductive and nonconductive. Inductor 23 combines with storage capacitor 21 to provide an LC filter, and diode 29 serves to conduct current generated by inductor 23 during the time when the source-drain circuit of transistor 30 is not conducting.

In operation, the voltage stored in capacitor 21 is a function of the duty cycle of MOS-FET transistor 30, which may be switched on and off at a frequency in excess of 100 kHz. Specifically, the d.c. voltage applied from terminals 25, 27 across capacitor 21 is applied for a greater or longer portion of each switching cycle of MOS-FET transistor 30 as the duty cycle of the transistor increases or decreases. The net voltage transfer to the capacitor is therefore dependent on the duty cycle of MOS-FET 30. The duty cycle of MOS-FET transistor 30 is, as clearly seen in FIG. 1, a function of the sum of the terms in expression (1); that is, it is a function of the sum of the amplitude of the feedback signal l(t) plus the time rate-of-change (or derivate with respect to time) of the amplitude of feedback signal l(t). Thus, the voltage applied across the laser tube 20 from capacitor 21, and hence the laser light power level, is controlled by that level and the time rate-of-change of that level. The resulting second order feedback control loop permits wide band loop operation to accommodate the high speed switching of MOS-FET transistor 30, with the attendant advantages noted above.

Figure 2:
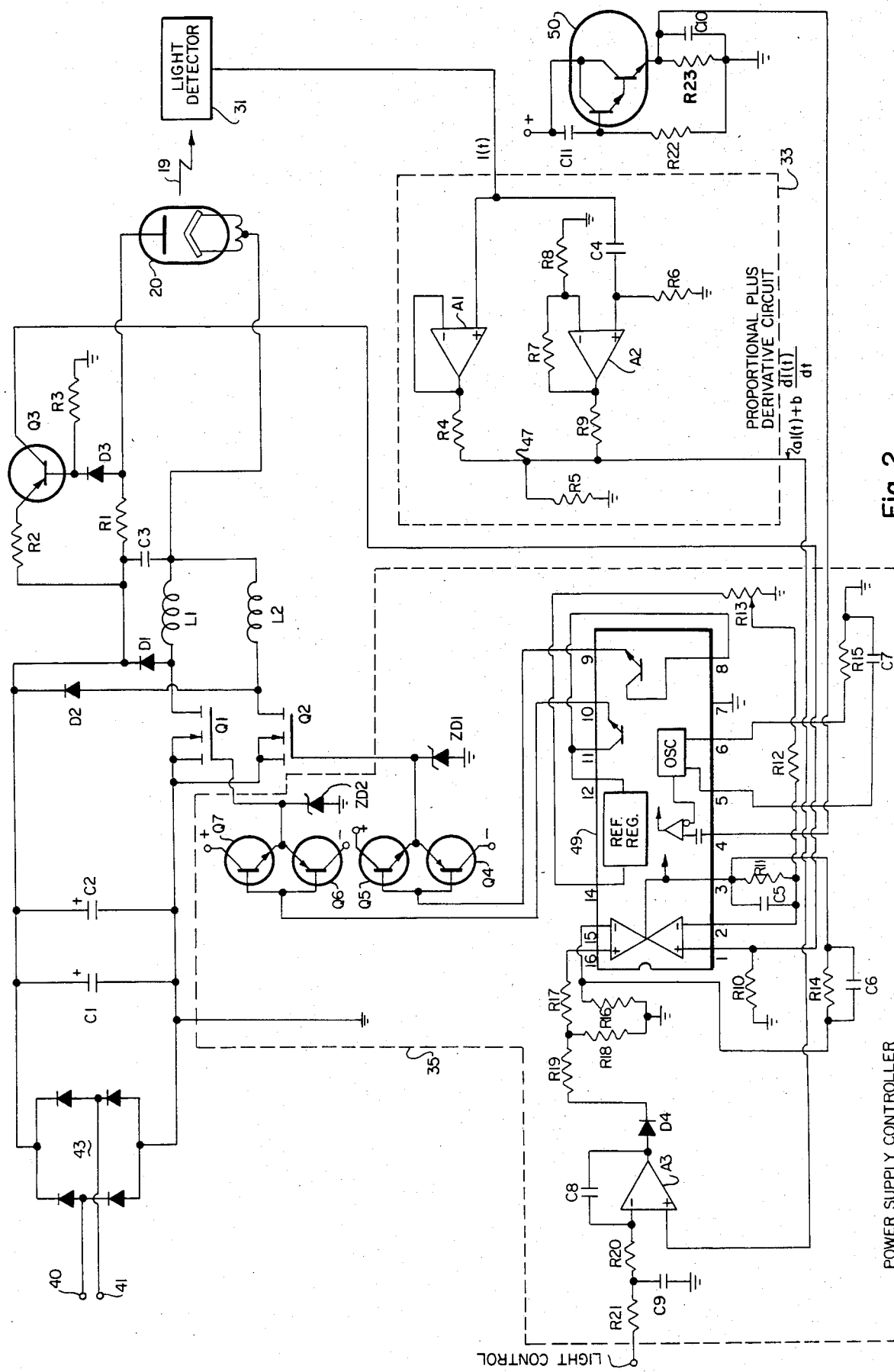
FIG. 2 is a detailed schematic diagram of the preferred embodiment illustrated in FIG. 1.

Reference is next made to FIG. 2, which illustrates in more detail one presently preferred embodiment of a schematic diagram which embodies the principals of the present invention as illustrated in the simplified diagram of FIG. 1. Those of ordinary skill in the art will of course appreciate that various modifications to the detailed schematic diagram of FIG. 2 may be easily made without departing from the essential characteristics of the invention as described and illustrated in the diagram of FIG. 1. Hence, the detailed schematic diagram in FIG. 2 is intended only as an example of one presently preferred embodiment of the general principals of the invention as illustrated and described above.

With reference to FIG. 2, portions of the schematic diagram which correspond to the block diagram of FIG. 1 have been enclosed by broken lines indicated at 33 and 35. The portion of the schematic diagram enclosed by the broken line box at 33 corresponds to the proportional-plus-derivative circuit, and the portion of the schematic diagram enclosed by the broken line box 35 corresponds to the power supply controller.

With continued reference to FIG. 2, an a.c. voltage, typically 115 volts, 60 Hz, is applied via input terminals 40, 41 to a full-wave rectifier 43. The resulting unipolar voltage is filtered by capacitors C1 and C2 connected in parallel across rectifier 43. The anode terminal of laser tube 20 is connected to one side of capacitors C1, C2 through a current sampling resistor R1. The cathode terminal of laser tube 20 is connected through mutually parallel switching circuits to the other side of capacitors C1, C2. One switching circuit includes the source-drain circuit of a MOS-FET switching transistor Q1 and an inductor L1 connected in series, with the inductor connected to capacitors C1, C2. The second switching circuit is similar and includes the source-drain circuit of MOS-FET switching transistor Q2 and an inductor L2. Storage capacitor C3, corresponding to capacitor 21 of FIG. 1, is connected across the supply voltage terminals of laser tube 20 with current sampling resistor R1 interposed between the capacitor C3 and laser tube. Each of the mutually parallel switching circuits includes a diode D1, D2, respectively. Diode D1 has its anode connected to the junction between inductor L1 and transistor Q1, and its cathode connected to the side of capacitor C3 remote from inductor L1. Similarly, diode D2 has its anode connected to the junction between inductor L2 and transistor Q2, and its cathode connected to the cathode of diode D1.

A current sampling circuit is connected such that current sampling resistor R1 is connected to the cathodes of diodes D1, D2 and between storage capacitor C3 and one of the laser supply voltage terminals. The current sampling circuit additionally includes a bipolar PNP transistor Q3 having a resistor R2 connected between its emitter and the junction between resistor R1 and capacitor C3. The other side of resistor R1 is connected to the anode of a diode D3 which has its cathode connected to the base of transistor Q3. A bias resistor R3 is connected between the base of transistor Q3 and ground. The collector of transistor Q3 is connected to provide a laser current limiting control function in the manner described hereinbelow.

The proportional-plus-derivative circuit 33, which receives the feedback signal l(t) from light detector 31 includes a pair of differential operational amplifiers A1 and A2. Amplifier A1, which serves as a voltage follower buffer amplifier, receives the feedback signal at its non-inverting terminal and has a direct feedback connection to its inverting terminal from its output terminal. A resistor R4 is connected from the output terminal of amplifier A1 to a summing junction 47 which is returned to system ground via a resistor R5.

The feedback signal is capacitively coupled via capacitor C4 to the non-inverting input terminal of amplifier A2 which is resistively coupled to ground via resistor R6. Capacitor C4 and resistor R6 serve as an input differentiator circuit for amplifier A2. A negative feedback circuit for amplifier A2 includes resistor R7, connected between the output and inverting input terminals, and resistor R8, connected between the inverting input terminal and ground. A further resistor R9 is connected between the output terminal of amplifier A2 and summing junction 47.

The proportional-plus-derivative output signal from circuit 33, which is represented by expression (1), includes a proportional term al(t) which is provided by amplifier A1 and its associated components. Specifically, amplifier A1 provides a voltage across resistor R5 which is directly proportional to the feedback signal l(t). The time rate-of-change component bdl(t)/dt of the output signal from circuit 33 is derived from amplifier A2 and its associated components. More specifically, the differentiation operation effected by resistor R6 and capacitor C4 is used by amplifier A2 to develop a voltage across resistor R5 having an amplitude proportional to the time rate-of-change of the amplitude of signal l(t). Summation junction 47 linearly combines or sums the two amplifier output signals to provide the resulting signal represented by expression (1).

The power supply controller circuit 35 includes two major active components, namely: differential operational amplifier A3; and pulse width modulator 49. The pulse width modulator employed with the preferred embodiment may take the form of the integrated circuit bearing model number TL494, manufactured by Texas Instruments, Incorporated of Dallas, Tex. and bearing the general designation "Pulse Width Modulation Control Circuit." The pin numbers for such circuit are illustrated adjacent block 49 in FIG. 2 and certain of the circuit components are schematically illustrated within the block, without all internal connections, for ease of reference. Pulse width modulator 49 includes an internal source (at pins 5 and 6) of square wave signal with a nominal 50% duty cycle that is dynamically controlled by the voltage difference between terminals 15 and 16 and, additionally, by the voltage difference between terminals 1 and 2. These voltage differences actuate internal logic circuitry (not illustrated) to effect pulse width modulation on the internal square wave signal to effect the desired duty cycle modulation. Two duty cycle-modulated voltages appear across terminals 10 and 11 and terminals 9 and 8. It should be noted that terminals 8 and 11 are connected to terminal 12 which is connected to the unregulated supply voltage for circuit 49. An internal reference voltage regulator is connected between terminals 14 and 12 to provide a precise internal supply voltage. An internal dead time control comparator connected at pin 4 normally provides approximately five percent dead time unless externally altered by applying an external control signal at pin 4.

External connections to pulse width modulator 49 are as follows. Pin 1 is connected to the collector of transistor Q3 in the current sampling circuit and is resistively coupled to ground via resistor R10. Pin 2 is connected through resistor R12 to the wiper arm of variable resistor R13. Pin 3 is connected through parallel-connected resistor R11 and capacitor C5 and through resistor R12 to the wiper arm of R13. Pin 4 is connected to a slow start circuit employed in initial turn-on of laser tube 20 and described more fully below. Pin 5 is capacitively coupled to ground via capacitor C7. Pin 6 is resistively coupled to ground via resistor R15. Pins 8, 11 and 12 are connected together and to the unregulated supply voltage for circuit 49 as noted above. Pin 9 is connected to the base electrodes of PNP transistor switch driver Q4 and NPN transistor switch driver Q5. The emitters of transistors Q4 and Q5 are connected together and to the gate electrode of MOS-FET switching transistor Q2 across ground-referenced zener diode ZD1. The collectors of transistors Q4 and Q5 are connected to respective reference voltage levels. Pin 10 is connected to the base electrodes of PNP transistor switch driver Q6 and NPN transistor switch driver Q7. The emitters of transistors Q6 and Q7 are connected together across ground referenced zener diode ZD2 and to the gate electrode of MOS-FET switching transistor Q1. The collectors of transistors Q6 and Q7 are connected to respective reference voltage levels. Pin 14 is connected to one end of variable resistor R13, the other end of which is grounded. Pin 15 is resistively coupled to ground through resistor R16. Pin 16 is connected to one side of resistor R17, the other side of which is connected to resistors R18 and R19.

Resistors R18 is returned to ground; resistor R19 is connected to the cathode of diode D4 which has its anode connected to the output terminal of amplifier A3. The non-inverting input terminal of amplifier A3 receives the proportional-plus-derivative signal from circuit 33. The inverting input terminal is connected to one end of resistor R20, the other end of which is connected to resistor R21 and capacitor C9. The latter is returned to ground; resistor R21, on the other hand, receives a light control signal having an amplitude representing the desired laser output light levels. This light control signal may be manually adjusted or adjusted under automatic control for the purpose of adjusting the laser output light level accordingly.

Amplifier A3 serves as the error amplifier for the laser light feedback control loop. It provides an error signal at pin 16 of circuit 49 with an amplitude equal to the difference between the amplitudes of the feedback signal (i.e. the proportional-plus-derivative signal) and the light control signal. This error signal is processed by pulse width modulation control circuit 49 to control the duty cycle of the co-phasal pulse trains appearing at pins 9 and 10. These pulse trains act through respective driver circuits Q4, Q5 and Q6, Q7 to alternately switch MOS-FET switching transistors Q1 and Q2 on and off simultaneously.

The primary s-plane pole-determining components for the feedback control loop are resistor R20 and capacitor C8 connected to the inverting input terminal of amplifier A3. This pole is selected far enough into the left hand plane to minimize resonance effects in the loop.

The duty cycle of the pulse trains at pins 9 and 10 may also be controlled by the current sampling circuit operating at pin 1 of pulse width modulation control circuit 49. If the current through the laser tube 20 becomes too high, the current sampling circuit reduces the duty cycle of the switching pulse trains applied to MOS-FETs Q1 and Q2 to limit that current.

Additional duty cycle control is achieved at pin 4 of circuit 49 by the slow start circuit including Darlington circuit 50. The base of the Darlington circuit is connected between capacitor C11 and resistor R22. The emitter of the Darlington stage is connected to resistor R23, across which is connected capacitor C10. The slow start circuit is used to provide a slowly building ramp voltage across capacitor C10 to gradually increase the duty cycle of the switching pulse trains from a low value to the desired value when the system is turned on. This prevents the laser voltage from building up too fast and thereby prevents a sudden current surge through the laser.

It should be noted that the specific proportional-plus-derivative circuit 33 and power supply controller circuit 35 illustrated in FIG. 2 are not to be construed as limiting on the scope of the invention. Likewise, the number of MOS-FET switching transistors (and associated inductors and diodes) employed is not a limitation on the invention.

By way of example only, and not to be construed as a limiting factor on the invention, the following list of component values is provided.

| COMPONENT | VALUE |
| --- | --- |
| Resistor R1 | 0.2 ohm (10 watt) |
| Resistor R2 | 5.6K ohm (10.25 watt) |
| Resistor R3 | 100K ohm (5 watt) |
| Resistors R4, R6, R8, R9, R13, R15 | 1K ohm (0.25 watt) |
| Resistors R5, R23 | 5.6K ohm (0.25 watt) |
| Resistors R7, R10, R12, R16, R17, R19, R20, R21 | 10K ohm (0.25 watt) |
| Resistors R11, R14 | 100K ohm (0.25 watt) |
| Resistor R18 | 15K ohm (0.25 watt) |
| Resistor R22 | 2.2M ohm (0.25 watt) |
| Capacitors C1, C2 | 1200 μf (350 volts) |
| Capacitor C3 | 100 μf (350 volts) |
| Capacitors C4, C8 | .0047 μf (50 volts) |
| Capacitors C5, C9, C10 | 0.1 μf (50 volts) |
| Capacitors C6, C7 | 0.01 μf (50 volts) |
| Capacitor C11 | 2 μf (50 volts) |

Transistors Q4 and Q6 may be 2N2905 types; transistors Q5 and Q7 may be type 2N2222. Capacitors C1, C2, C3, inductors L1, L2 and diodes D1, D2 are selected in accordance with the criteria described in the aforementioned U.S. Pat. No. 4,017,745 to McMahan which is incorporated herein by reference.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A power system for a laser comprising:
   power supply means for applying a voltage across said laser;
   detector means for sensing a feedback parameter of said laser and for providing a detector signal having an amplitude which varies as a function of the laser beam intensity;
   proportional-plus-derivative circuit means responsive to said detector signal for providing a proportionalplus-derivative signal having an amplitude which is proportional to the sum of the amplitude of the detector signal and the time rate-of-change of the amplitude of the detector signal; and control circuit means responsive to said proportional-plus-derivative signal for varying the voltage applied across said laser as a function of the amplitude of said proportional-plus-derivative signal.

2. A system according to claim 1 wherein said control circuit means includes:

storage capacitance means connected across said laser and said power supply means;

cyclically-operated switching means, operative with a controllable duty cycle, for periodically interrupting and then restoring current flow between said power supply means and said storage capacitance means; and modulator means for adjusting said duty cycle of said switching means as a function of said proportional-plus-derivative signal.

3. A system according to claim 2 wherein said switching means includes at least one MOS-FET switching transistor connected between said power supply means and said storage capacitance means.

4. The apparatus according to claim 2 wherein:

said system includes means for developing a control signal having an amplitude representing the desired level of said laser beam intensity;

said control circuit means includes error amplifier means for providing an error signal having an amplitude proportional to the amplitude difference between the proportional-plus-derivative signal and said control signal; and wherein said modulator means is connected to receive said error signal and to adjust said duty cycle in proportion to the amplitude of said error signal.

5. A system according to claim 4 wherein said switching means includes:

first and second MOS-FET switching transistors, each having a source-drain circuit and a gate electrode;

first and second inductances connected in series with the source-drain circuit of said first and second switching transistors, respectively, between said power supply means and said storage capacitance means;

a first diode connected in parallel across the series connection of said first inductance and said storage capacitance and having a polarity opposite to the polarity of voltage stored at said storage capacitance;

a second diode connected in parallel across the series connection of said second inductance and said storage capacitance with a polarity opposite to the polarity of the voltage stored in said storage capacitance; and driver means connected between said modulator means and the gate electrodes of said switching transistors.

6. A system according to claim 5 wherein said driver means comprises:

first transistor driver amplifier means connected between said modulator means and the gate electrode of said first switching transistor; and second transistor driver amplifier means connected between said modulator means and the gate electrode of said second switching transistor.

7. A system according to claim 6 wherein said modulator means comprises:

oscillator means for providing a square wave signal;

gating means responsive to said error signal and said square wave signal for providing a pulse train with a duty cycle that is a function of said error signal; and means connecting said pulse train to said first and second transistor driver amplifiers.

8. A system according to claim 2 including further means for establishing an upper limit of current supplied to said laser, said further means comprising:

current sampling means for sensing the current supplied to said laser and providing a sampling signal having an amplitude representing the laser current; and means for additionally controlling the duty cycle of said switching means as a function of the amplitude of said sampling signal.

9. A system according to claim 1 wherein said proportional-plus-derivative circuit means comprises:

buffer amplifier means for receiving said detector signal and providing a buffered signal having an amplitude proportional to the amplitude of the detector signal;

differentiator means responsive to said detector signal for providing a derivative signal having an amplitude proportional to the time rate-of-change of the amplitude of said detector signal; and summing means for receiving said buffered signal and said derivative signal and providing said proportional-plus-derivative signal with an amplitude proportional to the sum of the amplitudes of said buffered and derivative signals.

10. A power system for a laser comprising:

a fixed voltage d.c. power supply connected to said laser;

a storage capacitance connected in parallel with said laser;

a switching circuit connected between said power supply and said laser to control the voltage applied across said laser, said switching circuit including:

a plurality of at least two MOS-FET switching transistors each having a source-drain circuit connected in mutually parallel circuits and in series with said storage capacitance and said power supply, said MOS-FET switching transistors each including a gate electrode;

a like plurality of at least two inductances connected in series with respective source-drain circuits in said mutually parallel circuits;

a like plurality of at least two diodes, each connected across a respective series circuit which includes said storage capacitance and a respective one of said inductances, each diode being polarized in opposition to the polarity of charge stored in said storage capacitance; and gate drive means for rendering said MOS-FET switching transistors alternately conductive and non-conductive by developing and applying an alternating signal to said gate electrodes; and further means responsive to light energy emitted by said laser for varying the duty cycle of said alternating signal provided by said gate drive.

11. A power system according to claim 10 wherein said further means comprises:

light detector means for sensing the light energy emitted by said laser and providing a detector signal having an amplitude proportional to the emitted laser light energy; and proportional-plus-derivative circuit means for receiving said detector signal and providing a proportional-plus-derivative signal having an amplitude proportional to the sum of the detector signal amplitude and the time rate-of-change of the detector signal amplitude; and wherein said gate drive means includes means for controlling the duty cycle of said alternating signal as a function of the amplitude of said proportional-plus-derivative signal.

12. A power system according to claim 11 wherein said proportional-plus-derivative circuit means includes:
 a buffer amplifier for receiving said detector signal and providing a buffered signal having an amplitude proportional to the amplitude of the detector signal;
 differentiator means responsive to said detector signal for providing a derivative signal having an amplitude proportional to the time rate-of-change of the amplitude of said detector signal; and
 summing means for receiving said buffered signal and said derivative signal and providing said proportional-plus-derivative signal with an amplitude proportional to the sum of the amplitudes of said buffered and derivative signals.

* * * * *